(12) United States Patent
McConnell et al.

(10) Patent No.: US 6,390,427 B1
(45) Date of Patent: May 21, 2002

(54) UNIVERSAL BRACKET ASSEMBLY FOR ACCESSORIES (75) Inventors: Thomas E. McConnell; Michael E. Henley, both of Santa Ynez, CA (US)

(73) Assignee: Prince Lionheart, Santa Maria, CA (US)

( * ) Notice: Subject to any disclaimer, the term of this patent is extended or adjusted under 35 U.S.C. 154(b) by 0 days.

(21) Appl. No.: 09/543,655

(22) Filed: Apr. 5, 2000

(51) Int. Cl.[7] .............................. A47B 96/06; E04G 5/06
(52) U.S. Cl. .............................. 248/231.61; 248/228.3; 248/311.2
(58) Field of Search ........................ 248/231.61, 689, 248/229.24, 228.5, 230.5, 231.85, 311.2, 314, 221.11, 222.11, 222.12, 222.13, 225.11

(56) References Cited

U.S. PATENT DOCUMENTS

| 591,390 A | 10/1897 | Dunnigan |
|---|---|---|
| 809,896 A | 1/1906 | Bender |
| 1,045,932 A | 12/1912 | Beckworth |
| 1,069,160 A | 8/1913 | Meltz |
| 1,116,265 A | 11/1914 | Graham |
| 1,134,577 A | 4/1915 | Apple |
| 1,577,298 A | 3/1926 | Roeller |
| 2,209,846 A | 7/1940 | Pawsat |
| 2,437,331 A | 3/1948 | Murray et al. |
| 2,461,071 A | 2/1949 | Mettenleiter |
| D153,348 S | 4/1949 | Gainsbro |
| 2,506,119 A | 5/1950 | Tregear |
| 2,628,054 A | 2/1953 | Fazakerley |
| 2,633,278 A | 3/1953 | Muniz |
| 2,745,465 A | 5/1956 | Hogan |
| 2,750,951 A | 6/1956 | Barnwell |
| 2,799,967 A | 7/1957 | Molinari |
| 2,810,221 A | 10/1957 | Reifsnyder |
| 2,912,991 A | 11/1959 | Shinn |
| 3,013,691 A | 12/1961 | Prentice |
| 3,107,029 A | 10/1963 | Rylander |
| 3,113,677 A | 12/1963 | Johnson |
| 3,118,645 A | 1/1964 | Lewis et al. |
| 3,184,201 A | 5/1965 | Smith |
| 3,338,628 A | 8/1967 | Evans |
| 3,380,698 A | 4/1968 | Goldberg et al. |
| 3,526,314 A | 9/1970 | Trammell, Jr. |
| 3,531,072 A * | 9/1970 | Lindquist .................... 248/113 |
| 3,532,318 A | 10/1970 | Lloyd |
| 3,603,549 A | 9/1971 | Brilando |
| 3,698,675 A | 10/1972 | Lerew et al. |
| 3,719,305 A | 3/1973 | Pressnell |
| 3,734,439 A | 5/1973 | Wintz |
| D228,304 S | 9/1973 | Lerew |
| D228,335 S | 9/1973 | Jackson |

(List continued on next page.)

*Primary Examiner*—Anita King
(74) *Attorney, Agent, or Firm*—Alvin R. Wirthlin; Akin Gump Strauss Hauer & Feld, LLP (57) ABSTRACT

A bracket assembly for connecting a cup holder or other accessory to a bar or other support structure includes first and second telescoping bracket portions that fit around and clamp to the support structure. One of the bracket portions includes a connector wall with an opening sized to receive a mounting trunnion of the accessory and a pair of ears with a slot formed therebetween in communication with the opening. Each ear has a convex inner edge that faces the inner edge of the other ear to define the slot. A width of the slot is less than a diameter of the trunnion such that the ears deflect upon insertion of the trunnion through the slot and return to an undeflected position with the trunnion located in the opening to thereby mount the accessory to the bracket assembly, and thus to the support structure.

32 Claims, 4 Drawing Sheets

U.S. PATENT DOCUMENTS

| | | |
|---|---|---|
| 3,808,415 A | 4/1974 | Hurst |
| 3,840,153 A | 10/1974 | Devlin |
| 3,842,981 A | 10/1974 | Lambert |
| 3,904,041 A | 9/1975 | Medgebow |
| 4,071,175 A | 1/1978 | Wagnon |
| 4,074,683 A | 2/1978 | Di Chiara |
| 4,088,250 A | 5/1978 | Schaefer |
| 4,131,259 A | 12/1978 | Franks |
| 4,140,192 A | 2/1979 | Sharpe |
| 4,203,175 A | 5/1980 | Heine |
| 4,212,493 A | 7/1980 | Ledesky |
| 4,256,281 A | 3/1981 | Harris et al. |
| 4,274,567 A | 6/1981 | Sawyer |
| 4,289,156 A | 9/1981 | Ulics |
| 4,312,456 A | 1/1982 | Sinkhorn et al. |
| 4,390,927 A | 6/1983 | Von Feldt |
| 4,410,115 A | 10/1983 | McClain, Jr. et al. |
| 4,419,794 A * | 12/1983 | Horton, Jr. et al. ........... 24/667 |
| 4,431,154 A | 2/1984 | Hamm |
| 4,436,232 A | 3/1984 | Zane et al. |
| 4,491,257 A | 1/1985 | Ingles |
| 4,570,835 A | 2/1986 | Criqui et al. |
| 4,596,370 A | 6/1986 | Adkins |
| 4,673,153 A * | 6/1987 | Hilty et al. ............ 248/231.81 |
| 4,697,780 A | 10/1987 | Wenkman et al. |
| 4,721,276 A * | 1/1988 | Moss ..................... 248/311.2 |
| 4,767,092 A | 8/1988 | Weatherly |
| 4,844,400 A | 7/1989 | Jasmagy, Jr. |
| 4,856,744 A | 8/1989 | Frankel |
| 4,896,858 A | 1/1990 | Sokolski et al. |
| 4,919,379 A | 4/1990 | Goetz |
| 4,984,722 A | 1/1991 | Moore |
| 5,014,892 A * | 5/1991 | Copeland .................... 224/271 |
| 5,014,956 A | 5/1991 | Kayali |
| 5,020,755 A | 6/1991 | Frankel |
| 5,106,046 A | 4/1992 | Rowles et al. |
| 5,141,192 A | 8/1992 | Adams |
| 5,143,335 A | 9/1992 | Frankel |
| 5,188,325 A * | 2/1993 | Hilty et al. .............. 248/224.8 |
| 5,238,211 A | 8/1993 | Borovski |
| 5,244,175 A | 9/1993 | Frankel |
| D346,141 S | 4/1994 | McConnell |
| 5,370,570 A * | 12/1994 | Harris ........................ 446/227 |
| 5,400,990 A | 3/1995 | Frankel |
| 5,464,183 A | 11/1995 | McConnell et al. |
| 5,503,297 A | 4/1996 | Frankel |
| 5,620,120 A * | 4/1997 | Tien .......................... 224/199 |
| 5,622,296 A * | 4/1997 | Pirhonen et al. ............ 224/197 |
| 5,833,180 A * | 11/1998 | Baranowski ................ 248/118 |
| 5,833,189 A * | 11/1998 | Rossman et al. ...... 248/231.61 |
| 5,857,601 A * | 1/1999 | Greenwood ................ 224/409 |

* cited by examiner

UNIVERSAL BRACKET ASSEMBLY FOR ACCESSORIES

BACKGROUND OF THE INVENTION

1. Field of the Invention

This invention relates to brackets, and more particularly to bracket assemblies that are mountable to support structures for connecting different accessory items to the support structures.

2. Description of the Related Art

Accessory items, such as drink holders, have often been associated with ambulatory vehicles such as automobiles, trucks, trains, aircraft, bicycles, strollers, wheelchairs, and the like. It is often unsafe, and at least inconvenient, to hold objects in the hand, especially when both hands are required for maneuvering the ambulatory vehicle. Even with stationary structures, it is desirous to keep the hands free for convenience and comfort. The absence of convenient holding articles for the accessory items makes accomplishing desired tasks more difficult. As a consequence, many accessory items have been proposed, along with brackets for holding the accessory items to a support structure.

U.S. Pat. No. 5,143,335 for example, discloses a support assembly having a hook portion that fits over a handle and a receptacle for holding a beverage container that snap-locks to the hook portion. U.S. Pat. No. 4,697,780 discloses a beverage container holder and a support bracket for mounting the holder to a structure. In these patents, no provision is provided for mounting the beverage container to supported structure that is tilted from vertical or horizontal.

U.S. Pat. No. 3,734,439 does provide a beverage container receptacle with an angularly adjustable clamp for connection to an inclined tubular section. The adjustable clamp assures that the receptacle, and thus the beverage container, remains upright.

Although the prior art includes different accessory items and accompanying brackets for mounting the accessory items to a support structure, a need exists for a single, universal bracket that may be used for a plurality of different accessory items and for a quick and convenient way for connecting the accessory items to the universal bracket.

SUMMARY OF THE INVENTION

It is therefore an object of the present invention to provide a universal bracket for connecting different accessory items to a support structure.

It is a further object of the invention to provide a universal bracket that is adaptable to different sizes and shapes of support structures.

It is an even further object of the invention to provide a bracket assembly that is relatively easy to use and low in cost.

According to one embodiment of the invention, a bracket assembly for connecting an accessory item to a support structure includes first and second bracket portions. The first bracket portion has a first base member with an inner surface for contacting a side of the support structure and a connector member extending from the first base member for receiving the accessory item. The second bracket portion has a second base member with an inner surface for contacting an opposite side of the support structure. The second base member is telescopically received in the first base member to form an opening between the inner surfaces for receiving the support structure therebetween. At least one fastener extends through the first and second bracket portions for connecting the portions together. In this manner, tightening the fastener draws the inner surfaces toward each other for securing the bracket assembly to the support structure.

According to a further embodiment of the invention, a bracket for connecting an accessory item to a support structure includes a base member for mounting to the support structure and a connector member extending from the base member for receiving the accessory item. The connector member has a connector wall with an opening sized to receive a mounting portion of the accessory item and a pair of ears with a slot formed therebetween in communication with the opening. Each ear has an inner edge that faces the inner edge of the other ear to define the slot. A width of the slot is preferably less than a cross dimension of the mounting portion of the accessory item such that the ears deflect when the mounting portion is inserted through the slot and return to an undeflected position when the mounting portion is located in the opening to thereby mount the accessory item to the bracket.

According to an even further embodiment of the invention, an accessory item and bracket assembly combination is provided for mounting the accessory item to a support structure. The accessory item has at least one wall, a shaft extending from the wall, and a flange located on a free end of the connector shaft. The bracket assembly comprises a first bracket portion adapted for mounting to the support structure. The first bracket portion has a first base member and a connector member extending from the base member. The connector member includes a connector wall having an opening sized to receive the shaft of the accessory item and a pair of ears with a slot formed therebetween in communication with the opening. Each ear has an inner edge that faces the inner edge of the other ear to define the slot. Preferably, a width of the slot is less than a cross dimension of the shaft such that the ears deflect upon insertion of the shaft through the slot and return to an undeflected position with the shaft located in the opening to thereby mount the accessory item to the bracket assembly.

Other objects and advantages of the invention will become apparent upon reading the following detailed description and appended claims, and upon reference to the accompanying drawings.

BRIEF DESCRIPTION OF THE DRAWINGS

The preferred embodiments of the present invention will hereinafter be described in conjunction with the appended drawings, wherein like designations denote like elements, and wherein.

It is noted that the drawings are intended to represent only typical embodiments of the invention and therefore should not be construed as limiting the scope thereof. The invention will now be described in greater detail with reference to the drawings, wherein like parts are represented by like numerals throughout the drawing figures.

DETAILED DESCRIPTION OF THE PREFERRED EMBODIMENTS

Figure 1:
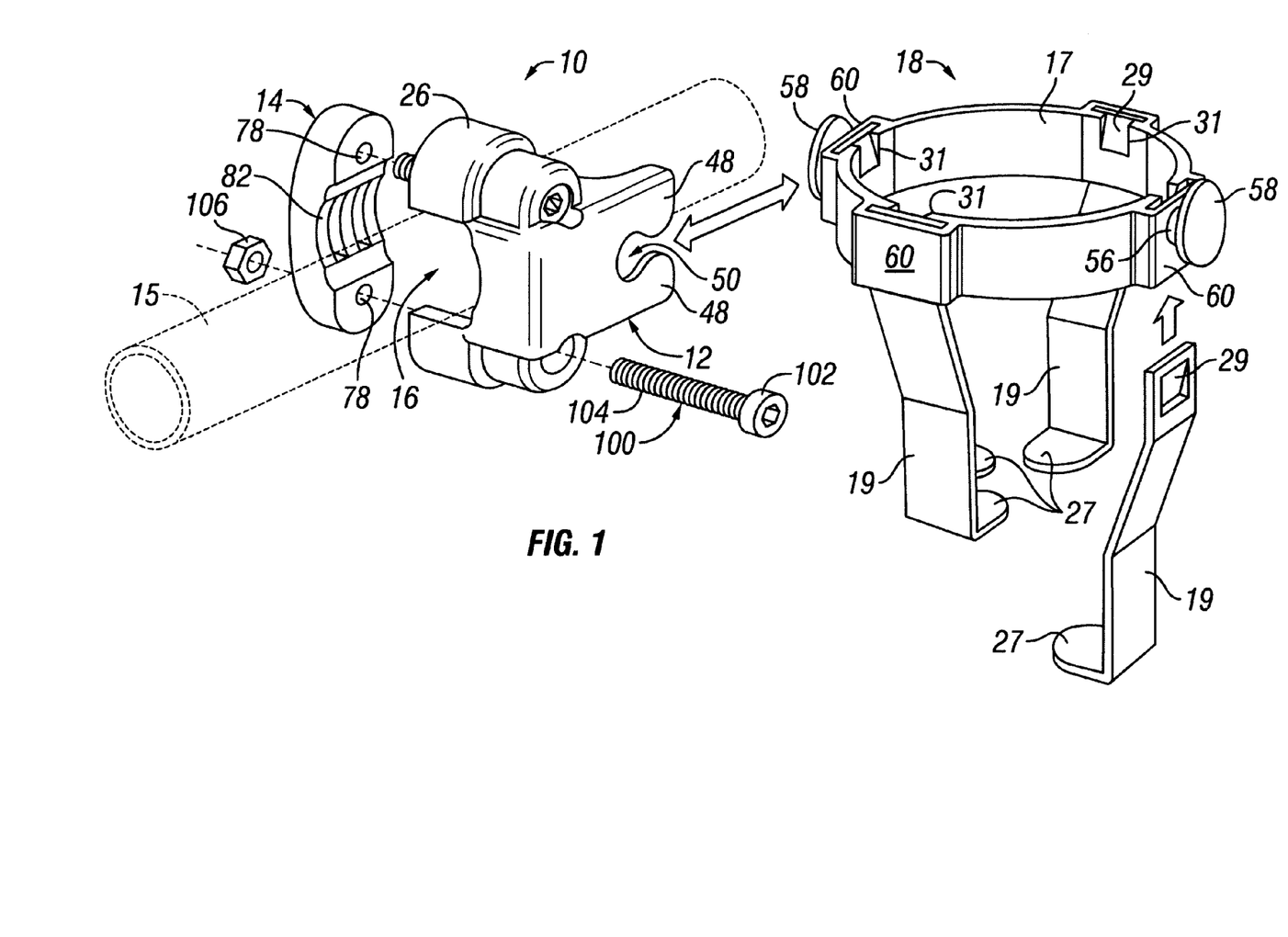
FIG. 1 is a rear isometric view of an accessory bracket assembly according to the present invention and illustrating the manner in which an accessory is mounted on the bracket assembly.

Referring now to the drawings, and to FIG. 1 in particular, a bracket assembly 10 according to the invention includes a first bracket portion 12 and a second bracket portion 14 that is telescopically received in the first bracket portion 12. The first and second bracket portions 12, 14 together form an opening 16 that circumcludes a support 15 (shown in phantom line) such as a bar, rod or the like in various cross sectional shapes and sizes for mounting the bracket assembly 10 to the support. Cross sectional bar shapes may include, but are not limited to round, oval, triangular, square, rectangular, hexagonal, octagonal, and so on. The support 15 may be associated with strollers, frames, handlebars, vehicles, lawn chairs, playpens, cribs, wheelchairs, crutches, toys, medical equipment, walkers, golf club carriers or other sports equipment, recreational equipment, and any other element, device, or machine having a bar-like or tube-like member.

The bracket assembly 10 is adapted to receive an accessory item 18 in a secure engagement for mounting the accessory item to the support 15, as will be described in grater detail below. One such accessory item is illustrated in FIG. 1 as a cup holder having an annular member 17 with legs 19 extending generally downwardly from the annular member and feet 27 that extend generally inwardly from the legs 19. The legs 19 are adapted for snap-fit connection with the annular member through the mutual engagement of an inwardly extending resilient tab 29 on an upper portion of each leg and an associated cut-out 31 in the annular member 17. The annular member 17 together with the legs 19 and feet 27 are adapted to support and hold a cup (not shown) and it's contents.

Other accessory items for connection to the bracket assembly 10 may include, but are not limited to stroller shades, stroller handle extenders, umbrellas, weather shields, sunshades, bag attachments, food trays or platforms, holders for bottles, money, brochures, and so on, display signs, toys, medical devices, illumination devices such as flashlights, reflectors, proximity detectors, mirrors, cellular phones and other electronic equipment, and so on. The manner in which the accessory items are connected to the bracket assembly will be described in greater detail below.

Figure 2:
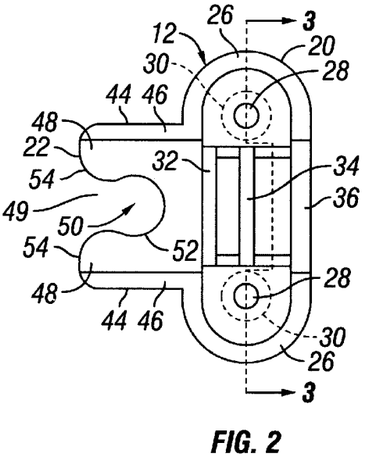
FIG. 2 is a rear elevational view of a first bracket portion according to the invention.
Figure 3:
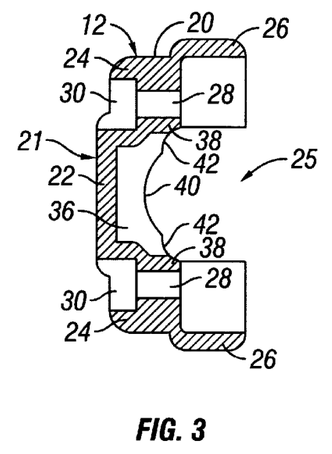
FIG. 3 is a cross sectional view of the first bracket portion taken along line 3—3 of FIG. 2.

With additional reference to FIGS. 2 and 3, the first bracket portion 12 according to an exemplary embodiment of the invention is preferably constructed of a plastic material and is integrally molded to form a unitary structure comprising a base member 20 and a connector wall 22 that extends upwardly from an outer forward end 21 of the base member 20. A semi-cylindrical sleeve 24 is formed at opposite sides of the base member 20. An enlarged semi-cylindrical flange 26 is formed on each sleeve 24 at an inner rearward end 25 of the base member 20. A bore 28 extends through each sleeve 24 and a depression or countersink 30 is formed in each sleeve at the forward end 21 of the base member 20.

An upper rib 32, middle rib 34, and lower rib 36 extend between inner walls 38 of the sleeves 24. The lower rib 36 is preferably an extension of the connector wall 22. As shown, each rib preferably includes an inwardly and rearwardly facing generally semi-circular edge or surface 40 that extends between inwardly and rearwardly facing concave edges or surfaces 42 which are adjacent the inner walls 38. The edge 40 and/or edges 42 are adapted to contact a support 15, such as a bar, rod or the like, during mounting of the accessory bracket assembly 10 thereto. It is to be understood that other shapes for the edge 40 and/or edges 42 are contemplated, and may vary depending on the shape of the support to which the accessory bracket assembly 10 is to be attached.

A pair of support webs 44 are formed at opposite sides of the connector wall 22. Each support web 44 extends between the connector wall 22 and a respective sleeve 24 and flange 26 for added strength and resistance to forces that may be present when an accessory 18 is mounted to the support wall. Preferably, an upper edge or surface 46 of each web 44 curves generally downwardly and rearwardly toward a respective flange 26.

Figure 10:
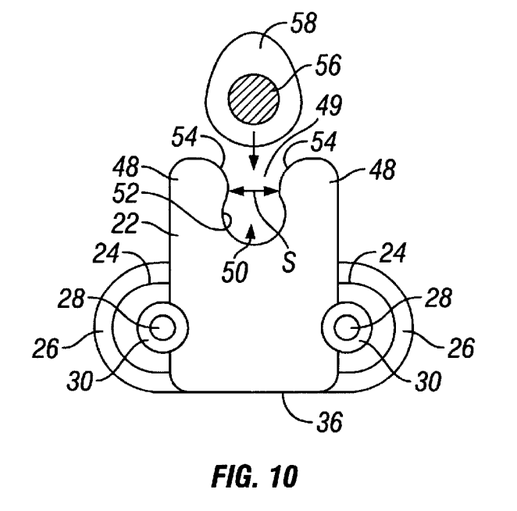
FIG. 10 is a front elevational view of the accessory bracket assembly and illustrating the manner in which an accessory is mounted on the bracket assembly.
Figure 11:
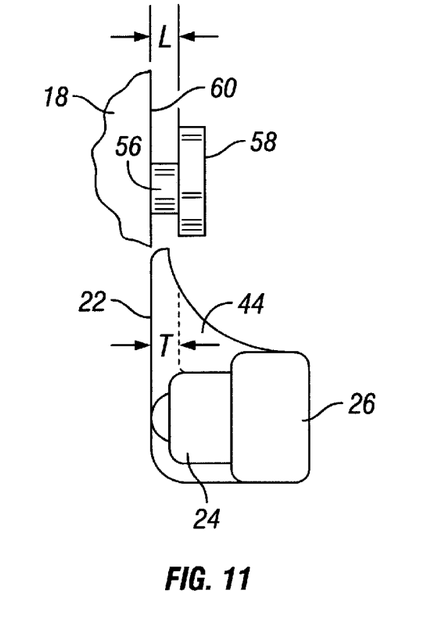
FIG. 11 is a side elevational view of the accessory bracket assembly and illustrating the manner in which an accessory is mounted on the bracket assembly.

With additional reference to FIGS. 10 and 11, the connector wall 22 includes a pair of ears 48 separated by a slot 49 in communication with a connector opening 50. The slot 49 and connector opening 50 are preferably located mid-way between the support webs 44. The connector opening 50 is defined by a generally upwardly facing semi-circular concave edge or surface 52, while the slot 49 is defined by a pair of generally inwardly facing convex edges or surfaces 54. The concave edge 52 is preferably sized to snugly receive a trunnion 56 (FIG. 11) that extends between a connector flange 58 and a wall 60 of the accessory 18. Preferably, the trunnion (and thus the accessory) is rotatable about a central axis of the connector opening. Alternatively, the connector opening may be octagonal in shape or other multi-faceted shape and the trunnion may have a similar cross-sectional shape to prevent relative rotation between the accessory item 18 and the bracket assembly 10, or alternatively, to permit indexing of the accessory to different orientations with respect to the bracket assembly. The number of indexing positions is dependent on the number of faces of the connector opening and trunnion. According to an even further embodiment of the invention, the flange 58 may be octagonal in shape or of any other multi-faceted shape such that a face of the flange 58 abuts the upper rib 32 to provide relative indexing between the accessory item and the bracket assembly.

The space S between innermost portions of the convex edges 54 is preferably smaller than the diameter of the trunnion 56 so that the ears 48 are forced apart during insertion of the trunnion into the slot 49 and return to their original position when the trunnion is seated in the opening 50, to thereby form a snap-fit connection. The connector wall 22 is preferably constructed of a relatively stiff plastic material for supporting the accessory 18, and yet sufficiently resilient to permit deflection of the ears 48 during insertion of the trunnion 56 into the opening 50. The thickness T of the connector wall 22 is preferably slightly less than or substantially equal to the length L of the trunnion 56 such that the wall 22 is in frictional contact with both the flange 58 and wall 60 of the accessory 18. In this manner, the relative rotational position of the accessory 18 and bracket assembly 10 can be adjusted by overcoming the frictional forces between the wall 22, flange 58 and wall 60, and then frictionally held in place after adjustment. This is especially advantageous when the bracket is mounted to an inclined support structure, since accessory items such as beverage container holders may be adjusted to an upright position to thereby prevent spillage. This may alternatively be accomplished by one of the indexing embodiments as described above.

Figure 4:
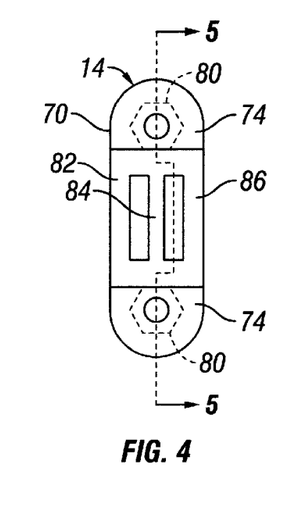
FIG. 4 is a rear elevational view of a second bracket portion according to the invention.
Figure 5:
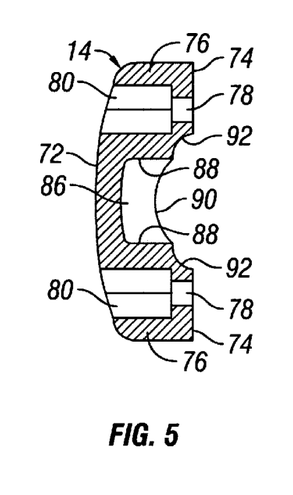
FIG. 5 is a cross sectional view of the second bracket portion taken along line 5—5 of FIG. 4.

Turning now to FIGS. 4 and 5, an exemplary embodiment of the second bracket portion 14 is illustrated. The second bracket portion 14 is preferably constructed of a plastic material and is integrally molded to form a unitary structure comprising a base member 70 with an outer rear surface 72 that is generally convex and a pair of inner front surfaces 74 that are relatively flat. A pair of sleeves 76 are formed at opposite sides of the base member 20 between the front and rear surfaces. A bore 78 is formed in each sleeve 76 and extends from the front surface 74 toward the rear surface 72. A hexagonal-shaped depression or countersink 80 is formed in each sleeve 76 and extends from the rear surface 72 to the bore 78. Preferably, the countersink 80 is coaxial with the bore 78.

An upper rib 82, middle rib 84, and lower rib 86 extend between inner walls 88 of the sleeves 76. As shown, each rib preferably includes a forwardly and inwardly facing generally semi-circular edge or surface 90 that extends between forwardly and inwardly facing concave edges or surfaces 92 which are adjacent the inner walls 88. The edge 90 and/or edges 92 are adapted to contact a support 15, such as a bar, rod or the like opposite the edges 40 and 42 of the first bracket portion 12 during mounting of the bracket assembly 10 to the support structure. Preferably, the upper, middle and lower ribs of the second bracket portion 14 are coincident with the upper, middle and lower ribs, respectively, of the first bracket portion 12. As with the first bracket portion 12, other shapes for the edge 90 and/or edges 92 are contemplated, and may vary depending on the shape of the support to which the accessory bracket assembly 10 is to be attached.

Although three ribs for the first and second bracket portions are preferred, more or less ribs may be provided, depending on the strength and clamping force desired for the bracket assembly 10. In an alternative arrangement, a solid wall may take the place of the ribs of one or both bracket portions, with a surface similar in shape to the rib edges.

Figure 6:
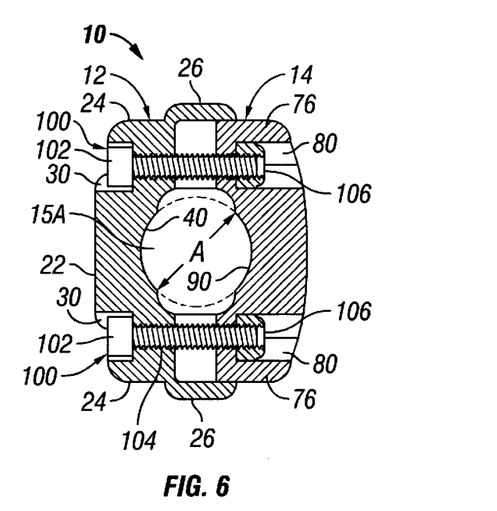
FIG. 6 is a cross sectional view of the accessory bracket assembly clamped around a bar having a relatively large diameter.

With reference now to FIGS. 6 through 9, the bracket assembly 10 is mounted on a support structure (shown in phantom line in the form of a bar) by positioning the first and second bracket portions 12 and 14 around the bar and sliding the portions together with the second bracket portion 14 being telescopically received in the flanges 26 of the first bracket portion 12. A fastener 100 having a head 102 and a threaded stud 104 is then installed in each collar 24 of the first bracket portion 12 and each collar 76 of the second bracket portion 14 with the head 102 seated in the countersink 30 and the stud 104 extending through the bores 28 and 78 (FIGS. 2–5) of the first and second bracket portions, respectively, and into the countersink 80 of the second bracket portion. A threaded, hexagonal-shaped lock nut 106 is positioned in each hexagonal-shaped countersink 80 such that rotation of the fasteners 100 in the lock nuts 106 in a first direction causes movement of the first and second bracket portions toward each other to thereby clamp the bar between the bracket portions with opposing rib edges 40 and 90 (FIGS. 3 and 5) in contact with the bar, as illustrated in FIG. 6. Rotation of the fasteners in the opposite direction loosens the bracket portions from the bar for removal or readjustment of the bracket assembly 10. Preferably, the center of curvature of the rib edges 40, 90 is substantially equal to the diameter of the largest bar the bracket assembly will be mounted to.

With the above-described arrangement, the bracket assembly 10 is readily adaptable to different bar sizes and shapes. By way of example, FIG. 6 shows the bracket assembly 10 mounted on a support bar 15A (shown in phantom line) having a diameter A. In this position, only a small portion of the collars 76 is telescopically received in the corresponding flanges 26.

Figure 7:
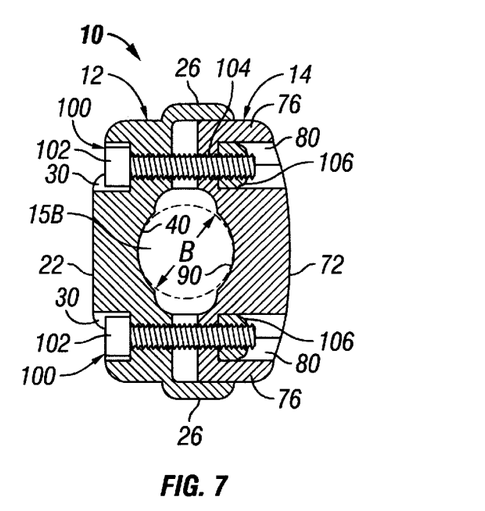
FIG. 7 is a cross sectional view of the accessory bracket assembly clamped around a bar having a relatively medium diameter.

In FIG. 7, the bracket assembly 10 is mounted around a support bar 15B (shown in phantom line) having a diameter B smaller than the diameter A. In this position, the collars 76 are telescopically received about half-way into the corresponding flanges 26.

Figure 8:
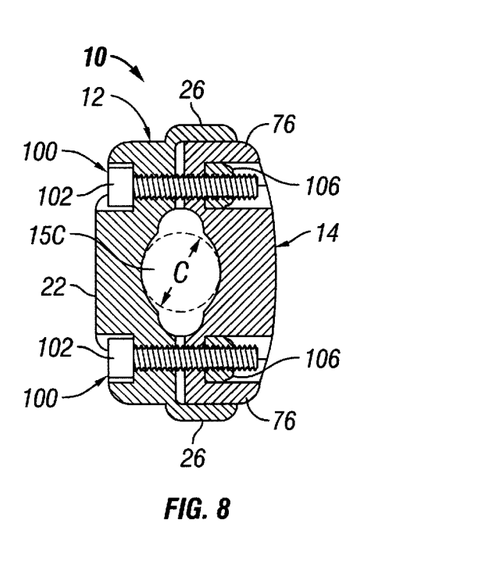
FIG. 8 is a cross sectional view of the accessory bracket assembly clamped around a bar having a relatively small diameter.

In FIG. 8, the bracket assembly 10 is mounted around a support bar 15C (shown in phantom line) having a diameter C smaller than the diameters A and B. In this position, a substantial portion of the collars 76 are telescopically received in the corresponding flanges 26.

Figure 9:
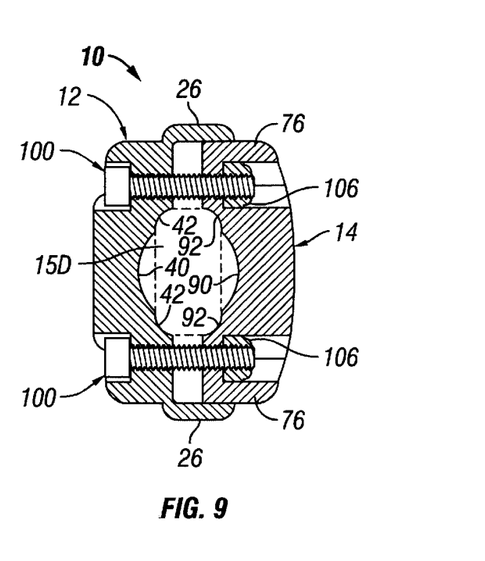
FIG. 9 is a cross sectional view of the accessory bracket assembly clamped around a bar having a rectangular cross section.

As shown in FIG. 9, a support bar 15D (shown in phantom line) is rectangular in shape and is clamped between the rib surfaces 42 of the first bracket portion 12 and the rib surfaces 92 of the second bracket portion 14. As with FIGS. 6 through 8, the bracket assembly 10 can be mounted to rectangular support bars of different widths due to the telescopic nature of the bracket portions 12 and 14.

An accessory item 18 may be installed to the bracket assembly 10 as previously described, either before or after securing the bracket assembly 10 to the support 15. If desired, two or more bracket assemblies 10 may be mounted on the same support for receiving one or more accessory items. When an accessory item is top heavy or sufficiently large to overcome the frictional forces and rotate, two or more bracket assemblies may be used to secure the accessory item against rotation.

Although the bracket assembly 10 has been described and shown in a particular orientation, it is to be understood that the invention is not limited thereto. The bracket assembly 10 may be mounted to a support in any orientation. Accordingly, the terms upward, downward, forward, rearward, lower, and their respective derivatives and equivalent terms as may be used throughout the specification denote relative, rather than absolute positions or orientations.

While the invention has been taught with specific reference to the above described embodiments, those skilled in the art will recognize that changes can be made in form and detail without departing from the spirit and scope of the invention. For example, although the connector wall 22 is shown as relatively flat, it may be curved to accommodate accessories with curved walls. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A bracket assembly for connecting an accessory item to a bar-shaped support structure, the bracket assembly comprising:
   a first bracket portion having a first base member with a first inner surface for contacting a side of the bar-shaped support structure;
   a second bracket portion having a second base member with a second inner surface for contacting an opposite side of the bar-shaped support structure, the second base member being telescopically received in the first base member to form an enclosed opening therebetween for receiving and encircling the bar-shaped support structure;
   at least one fastener extending through the first and second bracket portions for connecting the portions together;
   wherein tightening said at least one fastener draws the first and second inner surfaces toward each other for frictionally securing the bracket assembly to the bar-shaped support structure; and
   a connector member extending from one of the first and second base members for connection to the accessory item to thereby connect the accessory item to the bar-shaped support structure.

2. A bracket assembly according to claim 1, wherein the connector member comprises a connector wall extending from the one base member and having an opening sized to receive a mounting portion of the accessory item in snap-fit engagement.

3. A bracket assembly according to claim 2, wherein the connector wall includes a pair of ears with a slot formed therebetween in communication with the opening, each ear having a curved inner edge that faces the curved inner edge of the other ear to define the slot, a width of the slot being less than a cross dimension of the mounting portion of the accessory item such that the ears deflect when the mounting portion is inserted through the slot and return to an undeflected position when tee mounting portion is located in the opening to thereby hold the accessory item on the bracket assembly.

4. A bracket assembly according to claim 3, and further comprising at least one support web extending between the connector wall and the one base member.

5. A bracket assembly according to claim 4, wherein the at least one support web comprises a pair of spaced support webs located at opposite sides of the opening.

6. A bracket assembly according to claims 2, and further comprising at least one support web extending between the connector wall and the one base member.

7. A bracket assembly according to claim 6, wherein the at least one support web comprises a pair of spaced support webs located at opposite sides of the opening.

8. A bracket assembly according to claim 7, wherein the one base member, the connector wall and the support webs are integrally formed as a unitary structure.

9. A bracket assembly according to claim 1, wherein the first bracket portion comprises a pair of first sleeves formed at opposite sides of the first base member, each sleeve having a bore for receiving the at least one fastener, and a flange formed on each sleeve and extending inwardly therefrom, the flanges of the sleeves being sized to telescopically receive the second bracket portion.

10. A bracket assembly according to claim 9 wherein the second bracket portion comprises a pair of second sleeves formed at opposite sides of the second base member, each second sleeve being in alignment with a corresponding one of the first sleeves and having a bore that is coaxial with the bore of the corresponding first sleeve to thereby receive the at least one fastener for connecting the first and second bracket portions together.

11. A bracket assembly according to claim 10, wherein;
   the first inner surface is located between, and extends transverse to, the first pair of sleeves; and
   the second inner surface is located between, and extends transverse to, the second pair of sleeves in opposing relationship with the first pair surface, such that when the bracket is mounted to the bar-shaped support structure, the bar-shaped support structure extends through the bracket between the first and second pairs of sleeves.

12. A bracket assembly according to claim 11, wherein each of the first and second inner surfaces comprises an arcuate portion for contacting the bar-shaped support structure.

13. A bracket for connecting an accessory item to a bar-shaped support structure, the bracket comprising:
   a first base member with a first inner surface for contacting a side of the bar-shaped support structure;
   a second base member with a second inner surface for contacting an opposite side of bar-shaped support structure, the second base member being telescopically received in the first base member to form an enclosed opening therebetween for receiving and encircling the bar-shaped support structure;
   a connector member extending from one of the first and second base members for receiving the accessory item, the connector member including a connector wall having an opening sized to receive a mounting portion of the accessory item and a pair of ears with a slot formed therebetween in communication with the opening, each ear having an inner edge that faces the inner edge of the other ear to define the slot, a width of the slot being less than a cross dimension of the mounting portion of the accessory item such that the ears deflect when the mounting portion is inserted through the slot and return to an undeflected position when the mounting portion is located in the opening to thereby connect the accessory item to the bracket.

14. A bracket according to claim 13, and further comprising at least one support web extending between the connector wall and the one base member.

15. A bracket according to claim 14, wherein the at least one support web comprises a pair of spaced support webs located at opposite sides of the opening.

16. A bracket according to claim 15, wherein the one base member, the connector wall and the support webs are integrally formed as a unitary structure.

17. A bracket according to claim 13, wherein the edge of each ear is convex.

18. In combination, an accessory item and a bracket assembly for mounting the accessory item to a bar-shaped support structure, the combination comprising:
   the accessory item having at least one wall, a shaft extending from the wall, and a flange located on a free end of the shaft;
   the bracket assembly comprising a first bracket portion including a first base member with a first inner surface for contacting a side of the bar-shaped support structure, a second bracket portion having a second base member with a second inner surface for contacting an opposite side of the bar-shaped support structure, the second base member being telescopically received in the first base member to form an enclosed opening therebetween for receiving and encircling the bar-shaped support structure, and a connector member extending from the first base member, the connector member including a connector wall having an opening sized to receive the shaft of the accessory item and a pair of ears with a slot formed therebetween in communication with the opening, each ear having an inner edge that faces the inner edge of the other ear to define the slot, a width of the slot being less than a cross dimension of the shaft such that the ears deflect upon insertion of the shaft through the slot and return to an undeflected position with the shaft located in the opening to thereby connect the accessory item to the bracket assembly.

19. The combination according to claim 18, wherein the inner edge of each ear is convex.

20. The combination according to claim 18, wherein a length of the shaft is approximately equal to a thickness of the connector wall to thereby cause frictional engagement of the connector wall with The wall and flange of the accessory item, whereby a rotational position of the accessory item relative to the bracket assembly can be adjusted by overcoming the frictional engagement forces and then frictionally held in place after adjustment.

21. The combination according to claim 18, and further comprising:
at least one fastener extending through the first and second bracket portions for connecting the portions together;
wherein tightening said at least one fastener draws the inner surfaces toward each other for frictionally securing the bracket assembly to the support structure.

22. The combination according to claim 21, wherein the first bracket portion further comprises a pair of first sleeves formed it opposite sides of the first base member, each sleeve having a bore for receiving the at least one fastener, and a flange formed on each sleeve and extending inwardly therefrom, the flanges of the sleeves being sized to telescopically receive the second bracket portion.

23. The combination according to claim 22, wherein the second bracket portion comprises a pair of second sleeves formed at opposite sides of the second base member, each second sleeve being in alignment with a corresponding one of the first sleeves and having a bore that is coaxial with the bore of the corresponding first sleeve to thereby receive the at least one fastener for connecting the first and second bracket portions together.

24. A bracket assembly according to claims 23, wherein:
the first inner surface is located between, and extends transverse to, the first pair of sleeves; and
the second inner surface is located between, and extends transverse to, the second pair of sleeves in opposing relationship with the first inner surface, such that when the bracket is mounted to the bar-shaped support structure, the bar-shaped support structure extend through the bracket between the first and second pairs of sleeves.

25. A bracket assembly according to claim 24, wherein each of the first and second inner surfaces comprises an arcuate portion for contact the bar-shaped support structure.

26. The combination according to claim 18, and further comprising at least one support web extending between the connector wall and the first base member.

27. The combination according to claim 26, wherein the as least one support web comprises a pair of spaced support webs located at opposite sides of the opening.

28. The combination according to claim 27, wherein the first base member, the connector wall and the support webs are integrally formed as a unitary structure.

29. The combination according to claim 18, and further comprising a plurality of different accessory items for connection to the bracket assembly, each accessory item having at least one wall, a shaft extending from the wall, and a flange located on a free end of the connector shaft.

30. The combination according to claim 29, wherein at least two of the accessory items are chosen from the group consisting of holders, umbrellas, sunshades, bag attachments, trays, toys, medical devices, illumination devices, electronic devices, and sporting equipment.

31. The combination according to claim 18, wherein the opening has a plurality of faces, and the shaft has a corresponding number of faces.

32. The combination according to claim 18, wherein the flange is multi-faced, the faces of the flange being adapted to sequentially contact the bracket assembly for indexing the accessory item with respect to the bracket assembly.

* * * * *